United States Patent Office 3,694,216
Patented Sept. 26, 1972

3,694,216
SILVER HALIDE EMULSIONS CONTAINING METHINE DYES WITH 1H,5H-PYRAZOLO-[1,2-a]PYRAZOLE - 1,3(2H),5,7(6H) - TETRONE NUCLEUS
Philip W. Jenkins, Rochester, N.Y., assignor to Eastman Kodak Company, Rochester, N.Y.
No Drawing. Filed June 29, 1970, Ser. No. 50,988
Int. Cl. G03c 1/10, 1/22
U.S. Cl. 96—128    7 Claims

ABSTRACT OF THE DISCLOSURE

The novel compound 1H,5H-pyrazolo[1,2-a]pyrazole-1,3(2H),5,7(6H)-tetrone

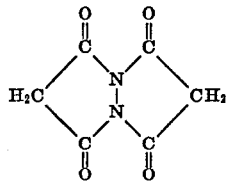

can be prepared by the reaction of hydrazine dihydrochloride with a dialkyl malonate in the presence of sodium alkoxide and is useful as an intermediate for novel dyes including merocyanine dyes such as

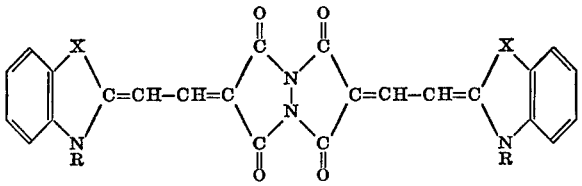

wherein R is alkyl and X is O, S, NH, Se or the like, the dyes being useful as photographic spectral sensitizing dyes or filter dyes.

---

This invention relates to novel chemical compounds and to compositions containing them and more particularly to novel methine dyes and to an intermediate for such dyes.

I have discovered the novel compound 1H,5H-pyrazolo-[1,2-a]pyrazole-1,3(2H),5,7(6H) - tetrone which can be represented as follows:

(I)

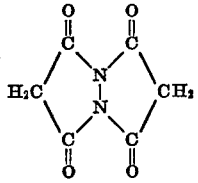

I have found that this compound is useful as an intermediate for novel methine dyes which are useful as addenda for photographic compositions, for example, as spectral sensitizing dyes or filter dyes.

The novel methine dyes of my invention are compounds which comprise at least one chromophoric nucleus joined by a methine or polymethine linkage to the 2-carbon atom of 1H,5H - pyrazolo[1,2-a]pyrazole - 1,3(2H),5,7(6H)-tetrone.

A principal group of dyes of this class are merocyanine dyes which can be represented as follows:

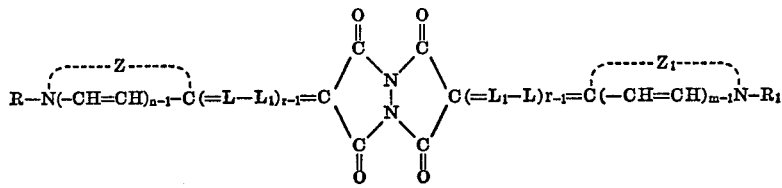

In the above formula:

R and $R_1$, which can be the same or different, each represents an alkyl group having from 1 to 18 carbon atoms (e.g., methyl, sulfoethyl, hydroxyethyl, hydroxypropyl, sulfobutyl, carboxybutyl, hexyl, octyl, dodecyl, etc.) or an aryl group of 6 to 12 carbon atoms (e.g., phenyl, sulfophenyl, carboxyphenyl, tolyl, etc.).

Z and $Z_1$, which can be the same or different, each represents the nonmetallic atoms required to complete a heterocyclic nucleus having from 5- to 6-atoms in the heterocyclic ring, which can contain a second hetero atom, e.g., a hetero oxygen, sulfur or selenium atom, or a second nitrogen atom, such as, a thiazole nucleus (e.g., thiazole, 4-methylthiazole, 4-phenylthiazole, 5-methylthiazole, 4,5-dimethylthiazole, 4,5-diphenylthiazole, etc.); a benzothiazole nucleus (e.g., benzothiazole, 4-chlorobenzothiazole, 5-chlorobenzothiazole, 4-methylbenzothiazole, 6-methylbenzothiazole, 5-bromobenzothiazole, 5-methoxybenzothiazole, 6-iodobenzothiazole, 5,6-dimethoxybenzothiazole, etc.); a naphthothiazole nucleus (e.g., α-naphthothiazole, β-naphthothiazole, 5 - methoxy-β-naphthothiazole, 8-ethoxy-α-naphthothiazole, β,β-naphthothiazole, etc.); a thianaphtheno-7',6',4,5-thiazole nucleous (e.g., 4'-methoxythianaphtheno-7',6',4,5-thiazole, etc.); an oxazole nucleus (e.g., 4-methyloxazole, 5-methyloxazole, 4-phenyloxazole, 4,5-diphenyloxazole, 4-ethyloxazole, 4,5-diethyloxazole, etc.); a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-ethoxybenzoxazole, 5,6 - dichlorobenzoxazole, 5-hydroxybenzoxazole, etc.); a naphthoxazole nucleus (e.g., α-naphthoxazole, β-naphthoxazole, β,β-naphthoxazole, etc.); a selenazole nucleus (e.g., 4-methylselenazole, 4-phenylselenazole, etc.); a benzoselenazole nucleus (e.g., benzoselenazole, 5-chlorobenzoselenazole, 6-methoxybenzoselenazole, 5-hydroxybenzoselenazole, a tetrahydrobenzoselenazole, etc.); a naphthoselenazole nucleus (e.g., α-naphthoselenazole, β-naphthoselenazole, β,β-naphthoselenazole, etc.); a thiazoline nucleus (e.g., thiazoline, 4-methylthiazoline, etc.); a 2-pyridine nucleus (e.g., 2-pyridine, 5-methyl-2-pyridine, etc.); a 4-pyridine nucleus (e.g., 4-pyridine, 3-methyl-4-pyridine, etc.); a 2-quinoline nucleus (e.g., 2-quinoline, 3-methyl-2-quinoline, 5-ethyl-2-quinoline, 6-chloro-2-quinoline, 8-chloro-2-quinoline, 4-methoxy-2-quinoline, 8-hydroxy-2-quinoline, etc.); a 4-quinoline nucleus (e.g., 4-quinoline, 5-methyl-4-quinoline, 7-methyl-4-quinoline, 8-chloro-4-quinoline, etc.); a 1-isoquinoline nucleus (e.g., 1-isoquinoline, 3,4-dihydro-1-isoquinoline, etc.); a 3-isoquinoline nucleus (e.g., 3-isoquinoline, etc.); a 3,3-dialkylindolenine nucleus (e.g., 3,3-dimethylindolenine, 3,3,5-trimethylindolenine, 3,3,7-trimethylindolenine, etc.); an imidazole nucleus (e.g., imidazole, 1-alkylimidazole, 1-alkyl-4-phenylimidazole, 1-alkyl-4,5-dimethylimidazole, etc.); a benzimidazole nucleus (e.g., benzimidazole, 1-alkylbenzimidazole, 1-arylbenzimidazole, 5,6-dichlorobenzimidazole, etc.); or a naphthimidazole nucleus (e.g., 1-alkyl-α-naphthimidazole, 1-aryl-β-naphthimidazole, 1-alkyl-5-methoxy-β-naphthimidazole, etc.).

L and $L_1$, which can be the same or different, represent methine groups such as —CE—, where E represents hydrogen, a lower alkyl, such as methyl, butyl, etc., an aryl group such as tolyl, naphthyl, etc., or a heterocyclic group, such as 2-thienyl, 2-pyrryl, 3-prryl, 2-indolyl, 3-indolyl, 3-pyridyl, 4-pyridyl, or

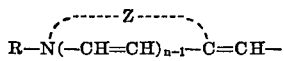

etc., such that not more than one of L and L₁ in any pair contains an E group that is other than hydrogen.

n and m, which can be the same or different, each represents an integer from 1 to 2, and q and r, which can be the same or different, each represents an integer from 1 to 3.

The novel bicyclic intermediate compound of the invention (I) can be prepared by the reaction of hydrazine dihydrochloride with a dialkyl malonate in the presence of sodium alkoxide. The reaction can be represented as follows:

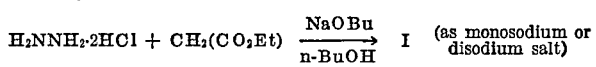

It is one of the advantages of the novel methine dyes of the present invention that they can be prepared in good yields from this inexpensive and reactive intermediate I, which itself is easily made from inexpensive starting materials and which reacts readily with the other intermediates for merocyanine dyes.

The following reaction has been reported in the literature (LeBerre et al., Compt. rend., 260, 5296 (1965); Chem. Abs. 63, 6990 (1965)):

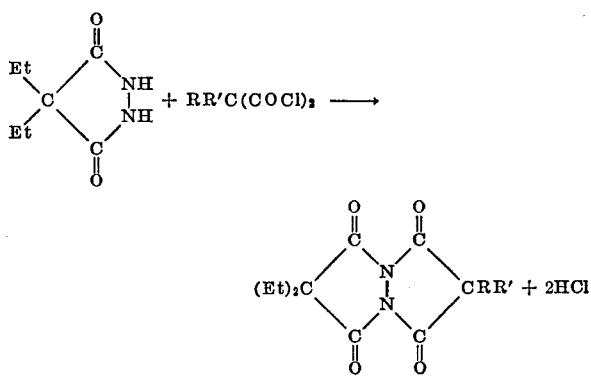

The product has the form of a tetra-substituted derivative of the novel compound I. The latter, however, apparently has not been reported in the literature and has not been prepared before my discovery of its preparation from hydrazine and dialkyl malonate. The novel compound I differs from the prior art compound, not only in its structure and method of preparation but also in its utility.

It will be noted that compound I has two methylene groups, each positioned between two carbonyl groups. These two methylene groups are highly active. By virtue of having two active methylene groups my novel intermediate compound can be reacted with conventional methine dye intermediates to form merocyanine dyes having one or more chromophoric nuclei. Those having a single chromophoric nucleus attached by a methine linkage to I still retain one of the active methylene groups of I and therefore can be further reacted to obtain a wide range of methine dyes. The derivatives of I in which both methylene groups are reacted to from methine linkages to chromophoric nuclei are useful and unusual in having two or more chromophoric nuclei linked by a group which interrupts the chain of conjugation of the molecule. The resulting compound is characterized by having two or more peaks in its radiation absorption curve. A broader band of absorption is the consequence, which can be advantageous when the compounds are used as filter dyes or as spectral sensitizing dyes.

The examples below illustrate the principles of the invention. The first example illustrates the preparation of the intermediate compound I. It is conveniently prepared and used as a salt, so when referred to in the claims, its salts are also meant to be included.

EXAMPLE I 1H,5H-pyrazolo[1,2-a]pyrazole-1,3(2H),5,7(6H)-tetrone monosodium salt

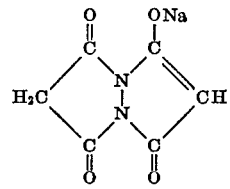

A n-butanol-sodium n-butoxide solution is prepared in a three-liter flask under a dry nitrogen atmosphere from dry n-butanol (1 l.) and freshly cut sodium metal (1 mol., 69.0 g.). After the solution has stood overnight under a dry nitrogen atmosphere, diethyl malonate (1 mol., 160.0 g.) is added. The mixture is brought slowly to 100° C. at which point the solution is homogeneous. The temperature is lowered to 85° C. and hydrazine dihydrochloride (1 mol. plus 100%, 105.0 g.) is adedd. The mixture is stirred magnetically while the temperature is cautiously raised to the reflux temperature. The mixture is then heated under reflux and stirred for twenty-four hours while passing a slow stream of dry nitrogen gas through the reaction flask. The reaction mixture is then concentrated to dryness. The residue is mixed with distilled water (1 l.). The resulting pasty but fluid white mixture is cooled to below 20° C. and made acid by the addition of concentrated hydrochloric acid (85 ml.) (the temperature is kept below 20° C. during acidification). The creamy but more fluid mixture is filtered. After the precipitate is washed with distilled water and dried, the yield of crude product is 52.9 g. (62%). This material, without further purification, is used in preparations described in Examples II–IX.

A sample of the crude product (5.0 g.) is dissolved in distilled water (20 ml.), filtered and the filtrate is chilled for two days. The solution is filtered and the collected precipitate washed with distilled water (precipitate discarded). The combined filtrate and washes (about 30 ml.) are diluted with ethanol (100 ml.) containing concentrated hydrochloric acid (2 ml.). The solution is chilled and the precipitate collected by filtration, washed with ethanol and dried. The partially purified product (2.20 g.) is slurried with distilled water (15 ml.), filtered, and the collected precipitate washed with distilled water (5 ml.) (precipitate discarded). The filtrate is diluted with ethanol (100 ml.) and chilled. After collection by filtration, washing with ethanol, and drying, the yield of pure product is 0.83 g. (17% recovery), M.P. >310° C.

Analysis—Calcd. for (percent): $C_6H_3N_2NaO \cdot \frac{1}{2}EtOH$: C, 39.4; H, 2.8; N, 13.2; Na, 10.8. Found (percent): C, 39.4; 39.6; H, 3.0; 3.1; N, 13.4; Na, 9.1, 9.0.

The following examples illustrate the preparation of merocyanine dyes of the invention:

EXAMPLE II

2 - [3-ethyl-2-benzothiazolinylidene)-1-methylethylidene]-1H,5H - pyrazolo[1,2-a]pyrazole - 1,3(2H),5,7,(6H)-tetrone monosodium salt

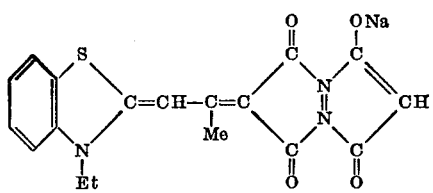

A mixture of 3-ethyl-2-thioacetonylidenebenzothiazoline (1 mol., 23.5 g.) and methyl p-toluenesulfonate (1 mol., 19.0 g.) is first fused over an open flame and then heated on a steam bath for two hours. The 3-ethyl-2-(2- methylthiopropenyl)benzothiazolium p-toluenesulfonate, so prepared and without further treatment, is mixed with 1H,5H-pyrazolo-[1,2-a]-1,3(2H),5,7(6H)-tetrone monosodium salt (1 mol. plus 100%, 19.1 g.,) triethylamine (1 mol., 10 g.) and N,N-dimethylacetamide (200 ml.). The mixture is heated with stirring at 130–148° C. for thirteen minutes, diluted with methanol (200 ml.) and filtered while still hot. The collected, insoluble material after drying weighs 24.90 g. and the filtrate, after standing, gives 0.25 g. of precipitate (see below). The material above which weighs 24.90 g. is slurried in boiling distilled water (400 ml.). The insoluble material is collected by filtration of the hot water mixture, washed with hot water, dried, and after further purification gives 17.50 g. (61%) of the dye described in Example VII.

The aqueous filtrate, above, is concentrated to dryness giving 3.75 g. of crude dye. This crude dye is combined with 0.25 g. of precipitate obtained from the methanol dilution of the reaction mixture above, boiled with dimethylacetamide (100 ml.) and the mixture is filtered hot. The insoluble material (3.40 g.) is mixed with m-cresol (50 ml.), heated with stirring to 140° C. and the insoluble material is again collected by filtration of the hot mixture. This m-cresol insoluble material (2.40 g.) is recrystallized by dissolving in hot, distilled water (35 ml.). The hot solution is filtered, the filtrate is diluted with methanol (100 ml.) and chilled. Filtration and drying give 0.37 g. of pure dye, M.P. >310° C.

EXAMPLE III 2,6-bis-[(3-ethyl-2-benzoxazolinylidene)ethylidene]-1H, 5H-pyrazolo[1,2-a]pyrazole-1,3(2H),5,7(6H)-tetrone

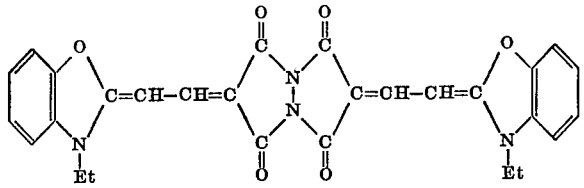

1H,5H - pyrazolo[1,2 - a]pyrazole - 1,3(2H),5,7(6H)-tetrone monosodium salt (1 mol. plus 30%, 2.50 g.), 2-(2-acetanilidovinyl)-3-ethylbenzoxazolium iodide (1 mol., 8.70 g.), acetic anhydride (1 mol. plus 25%, 2.50 g.), triethylamine (1 mol., 4.50 g.), and pyridine (50 ml.) are placed in a flask, and the mixture heated under reflux for fifteen minutes. The hot reaction mixture is filtered, and the precipitate of crude dye is washed with pyridine. After three recrystallizations carried out by dissolving the dye in m-cresol (10–50 ml.) at 140–150° C., filtering the hot m-cresol solution and reprecipitating the dye by dilution of the solution with methanol (150–500 ml.), the yield of pure dye is 0.70 g. (14%), M.P. >315° C.

Analysis.—Calcd. for $C_{28}H_{22}N_4O_6$ (percent): C, 65.9; H, 4.3; N, 11.0. Found (percent): C, 65.6; H, 4.3; N, 10.8.

EXAMPLE IV 2,6-bis-(3-ethyl-2-benzothiazolinylidene)-1H,5H-pyrazolo-[1,2-a]pyrazole-1,3(2H),5,7(6H)-tetrone

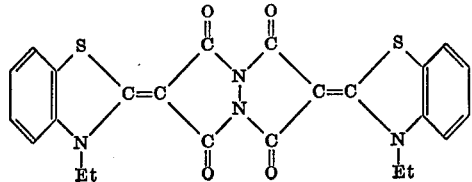

1H,5H - pyrazolo[1,2 - a]pyrazole - 1,3(2H),5,7(6H)-tetrone monosodium salt (1 mol., 1.90 g.), 3-ethyl-2-ethylthiobenzothiazolium ethylsulfate (1 mol., plus 100%, 14.35 g.), triethylamine (1 mol. plus 100%, 4.00 g.), and N,N-dimethylformamide (25 ml.) are mixed in a flask and heated under reflux for fifteen minutes. The reaction mixture is filtered while still hot, and the precipitate is washed with dimethylformamide, slurried with methanol, refiltered, and dried. After three recrystallizations from m-cresol (20–25 ml.) at 140–150° C. and methanol (100–150 ml.) with thorough washing of the purified dye during the last recrystallization, the yield of pure dye is 1.52 g. (31%), M.P. >310° C.

Analysis—Calcd. for $C_{24}H_{18}N_4O_4S_2$ (percent): C, 58.8; H, 3.7; N, 11.4; S, 13.1. Found (percent): C, 59.0; H, 4.0; N, 11.2; S, 13.3.

EXAMPLE V 2,6-bis-[(3-ethyl-2-benzothiazolinylidene)ethylidene]-1H, 5H-pyrazolo[1,2-a]pyrazole-1,3(2H),5,7(6H)-tetrone

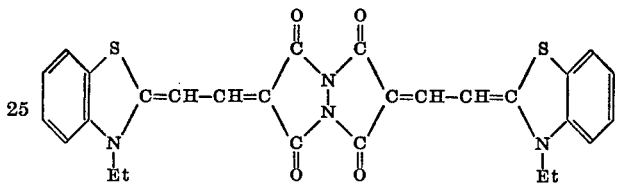

1H,5H - pyrazolo[1,2 - a]pyrazole - 1,3(2H),5,7(6H)-tetrone monosodium salt (1 mol. plus 30%, 2.5 g.), 2-(2-acetanilidovinyl)-3-ethylbenzothiazolium iodide (1 mol., 9.00 g.), triethylamine (1 mol., 2.00 g.), and N,N-dimethylformamide (50 ml.) are mixed in a flask and heated under reflux for fifteen minutes. The hot reaction mixture is filtered, and the precipitate is washed first with N,N-dimethylformamide and then with methanol. After three recrystallizations from m-cresol (50–115 ml.) at 140–150° C. and methanol (250–400 ml.) with thorough washing of the purified dye during the last recrystallization, the yield of pure dye is 2.20 g. (41%), M.P. >310° C.

Analysis.—Calcd. for $C_{28}H_{22}N_4O_4S_2$ (percent): C, 62.0; H, 4.1; N, 10.3; S, 11.8. Found (percent): C, 61.5; H, 4.0; N, 9.9; S, 12.2, 11.9.

EXAMPLE VI 2,6-bis-[(3 - ethyl - 2 - benzothiazolinylidene)-2-butenylidene] - 1H,5H - pyrazolo[1,2-a]pyrazole-1,3(2H),5,7-(6H)-tetrone

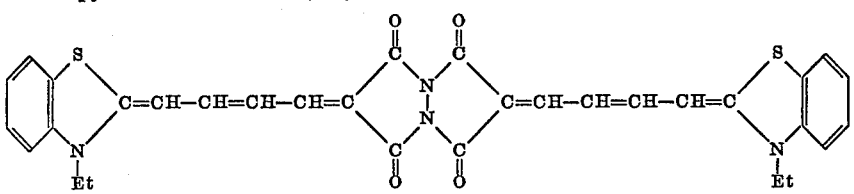

1H,5H - pyrazolo[1,2, - a]pyrazole - 1,3(2H),5,7(6H)-tetrone monosodium salt (1 mol., 2.70 g.), 2-(4-acetanilido-1,3-butadienyl)-3-ethylbenzothiazolium iodide (1 mol., 14.28 g.), triethylamine (1 mol., 3.00 g.), and N,N-dimethylformamide (50 ml.) are mixed in a flask and heated under reflux for twenty minutes. The hot reaction mixture is filtered, and the collected precipitate is washed with N,N-dimethylformamide, slurried with boiling methanol (550 ml.), collected again by filtration of the hot methanol slurry, and dried. After three recrystallizations from m-cresol (25–100 ml.) at 140–150° C. and methanol (125–500 ml.), the yield of pure dye is 0.37 g. (5%), M.P. >310° C.

EXAMPLE VII 2,6-bis-[(3-ethyl - 2 - benzothiazolinylidene)-1-methylethylidene] - 1H,5H - pyrazolo[1,2-a]pyrazole-1,3(2H),4,7(6H)-tetrone

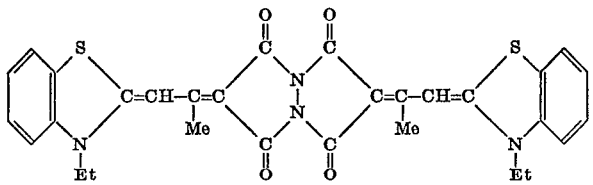

3-ethyl-2-thioacetonylidenebenzothiazoline (1 mol., 21.1 g.) and methyl p-toluenesulfonate (1 mol., 16.7 g.) are placed in a 300 ml. flask. The mixture is fused by heating briefly at 135° C. Heating is continued on a steam bath for 1.75 hours. The crystalline product is ground under dry benzene, collected by filtration, ground under ethyl ether, again collected by filtration and dried under vacuum. The 3-ethyl-2-(2-methylthiopropenyl) benzothiazolium p-toluenesulfonate so prepared weighs 35.0 g. This material (1 mol., 35.0 g.) is mixed with 1H,5H-pyrazolo-[1,2 - a]pyrazole-1,3(2H),5,7(6H)-tetrone monosodium salt (1 mol. plus 17%, 9.35 g.), triethylamine (1 mol. plus 8%, 9.0 g.), and N,N-dimethylacetamide. The mixture is heated with stirring at 130–140° C. for fifteen minutes. The reaction mixture is filtered while still hot. The collected precipitate is washed with N,N-dimethylacetamide, stirred with hot methanol (100 ml.), again collected by filtration, washed with methanol, and dried. The crude dye is boiled with distilled water, collected by filtration, washed with water and dried. After two recrystallizations from m-cresol (20–30 ml.) at 140° C. and methanol (100–150 ml.) with thorough washing of the purified dye with methanol during the last recrystallization, the yield of pure dye is 2.25 g. (9%), M.P. >310° C.

*Analysis.*—Calcd. for $C_{30}H_{26}N_4O_4S_2$ (percent): C, 63.1; H, 4.6; N, 9.8; S, 11.2. Found (percent): C, 62.9; H, 4.7; N, 9.8; S, 11.4.

EXAMPLE VIII

2 - [(3 - ethyl - 2 - benzothiazolinylidene)-1-methylethylidene] - [bis(3 - ethyl - 2 - benzothiazolinylidenemethyl)methylene] - 1H,5H - pyrazolo[1,2-a]pyrazole-1,3(2H)5,7(6H)-tetrone

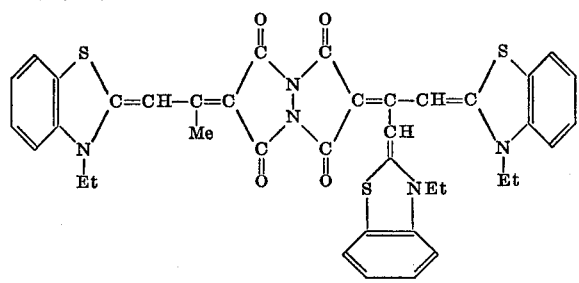

2,6 - bis - [(3 - ethyl-2-benzothiazolinylidene)-1-methylethylidene] - 1H,5H-pyrazolo[1,2a]pyrazole-1,3(2H),5,7-(6H)-tetrone (1 mol., 5.70 g.) is dissolved in m-cresol (50 ml.) at 147° C. with stirring. 3-ethyl-2-phenylthiobenzothiazolium iodide (excess, 16.0 g.) is added to the solution followed by triethylamine (excess, 4.0 g.), and the resulting mixture is heated at 140–160° C. with stirring for ten minutes. During the next twenty-five minutes additional quantities of 3-ethyl-2-phenylthiobenzothiazolium iodide (16.0 g. in two equal portions) and thiethylamine (4.0 g. in two equal portions) are added to the reaction mixture while maintaining the temperature at 140–170° C. and while stirring. The reaction mixture is allowed to cool and diluted with methanol (50 ml.). Successive amounts of methanol (300 ml. total) are added while the temperature is slowly lowered in steps to 0° C. All precipitates collected up to this point are discarded. The methanolic reaction mixture is then concentrated on a rotary evaporator and residual oil is stirred for 1 hour with ligroin (1 l.). The ligroin is decanted and replaced with ethyl ether (1 l.), and the stirring is continued until the residue is too viscous to conveniently stir. The ether is decanted, replaced with fresh ether (1 l.), and the mixture is allowed to stand overnight. The ether is decanted, and the residual semisolid is mixed with methanol (50 ml.). This mixture is heated under reflux for one hour and filtered hot (the filtrate is discarded). The collected precipitate is treated with boiling N,N-dimethylacetamide (50 ml.) and the mixture filtered while still hot. (This filtrate is saved, see below.) The purification of the N,N-dimethylacetamide insoluble material (2.65 g.) will be discussed in Example IX.

The N,N-dimethylacetamide filtrate above after chilling overnight yields upon filtration 0.20 g. of crude dye. This dye is recrystallized from N,N-dimethylacetamide and gives 0.09 g. (1%) of pure dye, M.P. >310° C.

*Analysis.*—Calcd. for $C_{39}H_{33}N_5O_4S_3$ (percent): C, 64.0; H, 4.5; S, 13.1. Found (percent): C, 63.7; H, 4.6; S, 13.0, 12.9.

A second preparation of this same dye is carried out as follows: 2,6 - bis - [(3-ethyl-2-benzothiazolinylidene)-1-methylethylidene] - 1H,5H - pyrazolo[1,2-a]pyrazole-1,3 (2H),5,7(6H)-tetrone is dissolved in m-cresol (50 ml.) at 120° C. To this solution is added 3-ethyl-2-ethylthiobenzothiazolium ethylsulfate (excess, 7.00 g.), and the mixture is heated with stirring to 145° C. At this point, 3-ethyl-2-phenylthiobenzothiazolium iodide (excess, 8.00 g.) and triethylamine are added to the reaction mixture. The reaction mixture is then stirred and heated at 140–150° C. for ten minutes. The mixture is allowed to cool somewhat, diluted with methanol (35 ml.) while still warm and then allowed to cool to room temperature. The mixture is filtered and the precipitate is washed with methanol (50 ml.) and dried. This gives 2.95 g. of recovered 2,6-bis-[(3-ethyl-2-benzothiazolinylidene)-1-methylethylidene] - 1H,5H - pyrazolo[1,2-a]pyrazole-1,3(2H),5,7(6H)-tetrone. The filtrate and washes above are combined and chilled. Filtration gives an additional 0.40 g. of the starting dye (total recovered starting dye is 3.35 g.). The filtrate is diluted with methanol (250 ml.) and chilled overnight. The precipitate is collected by filtration and dried giving 2.20 g. (73% corrected for recovered starting dye). This crude dye is boiled with N,N-dimethylacetamide (50 ml.). The hot mixture is filtered, and the N,N-dimethylacetamide insoluble material is dried giving 1.70 g. (57%) of partially purified dye. After two recrystallizations from m-cresol (20 ml.) at 140° C. and methanol (100 ml.) with thorough washing of the purified dye with methanol during the last recrystallization, the yield of pure dye is 1.35 g. (45% corrected), M.P. >310° C.

EXAMPLE IX 2,6 - bis[bis(3-ethyl-2-benzothiazolinylidenemethyl)methylene] - 1H,5H - pyrazolo[1,2 - a]pyrazole-1,3(2H),5,7-(6H)-tetrone

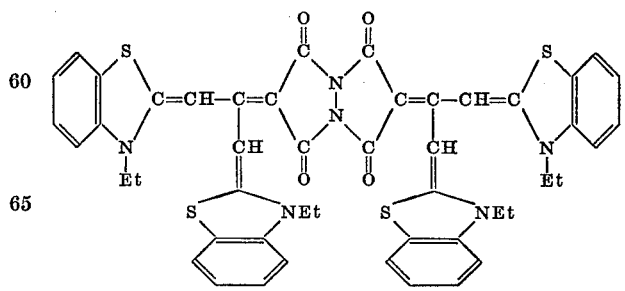

The N,N-dimethylacetamide insoluble material of the first part of Example VIII, which contains the subject dye, is purified by first boiling the crude dye (3.35 g.) with N,N-dimethylacetamide (50 ml.). The mixture is filtered while still hot, and the insoluble dye is washed with methanol and dried giving 1.60 g. After one recrystallization from hot m-cresol (20 ml.) and methanol with thorough washing of the purified dye with methanol, the yield of pure dye is 1.50 g. (17%), M.P. >350° C.

Analysis.—Calcd. for $C_{48}H_{40}N_6O_4S_4$ (percent): C, 64.6; H, 4.5; S, 14.4. Found (percent) C, 63.8; H, 4.6; S, 14.2.

The dyes of Examples II–IX are added to a silver bromoiodide emulsion (0.77 mole percent iodide) of the type described by Trivelli and Smith, Phot. Journal, 79, 330 (1939). The dyes, dissolved in suitable solvents, are added to separate portions of the emulsions at the concentrations indicated in the table below. After digestion at 52° C. for 10 minutes, the emulsions are coated at a coverage of 432 mg. Ag/ft.$^2$ on a cellulose acetate film support. A sample of each coating is exposed on an Eastman 1B sensitometer and to a wedge spectrograph, processed for 3 minutes at 20° C. in Kodak D-19 developer, fixed, washed and dried. The results are as follows:

| Example | Concentration, gram/mole Ag halide | Sensitizing range (nm.) up to— | Peak sensitivity (nm.) |
|---|---|---|---|
| II | 0.08 | | |
| III | 0.06 | 530 | 510 |
| IV | 0.08 | | |
| V | 0.05 | 600 | 560 |
| VI | 0.07 | | |
| VII | 0.08 | 590 | 530 |
| VIII | 0.09 | 640 | 590 |
| IX | 0.08 | 650 | 595 |

The above table shows that Dyes III, V, VII, VIII and IX are useful as spectral sensitizing dyes for a silver-bromoiodide emulsion. Although Dyes II, IV, and VI do not demonstrate spectral sensitization for this particular emulsion under the conditions of these tests they do have utility as components of photographic elements. They are useful, as I have indicated as filter dyes, i.e., where they are employed as dyes for a layer or layers of a photographic film or paper to modulate the light that reaches underlying emulsion layers and thus serve to control speed or color.

As an illustration of their utility as filter dyes the absorption data for Dyes II and IV in a 95/5 methanol/cresol solution and Dye V in a 50/50 aqueous methanol solution are as follows: Dye II, $\lambda_{max}$=461 nm.; Dye IV, $\lambda_{max}$=372 nm.; and Dye VI, $\lambda_{max}$=630 nm. For each dye the absorption peaks are reasonably narrow, which indicates utility for selective absorption of reasonably narrow bands of radiation. Thus Dye II absorbs in the blue range, Dye IV in the ultraviolet and Dye VI in the red.

An additional utility as supersensitizing dyes is demonstrated for the allopolar cyanine dyes of Examples VIII and IX in the following example.

EXAMPLE X

Supersensitization

A 0.2 $\phi$m sulfur- and gold-sensitized, cubic-grained gelatino-silver bromoiodide emulsion containing 2.5 mole percent iodide is employed. The dyes are added to separate portions of the emulsion at the concentrations indicated below and coated at 100 mg./ft.$^2$ on a cellulose acetate support. A sample of each coating is exposed to a tungsten light source in an Eastman 1B sensitometer through a wedge spectrograph and through a continuous step wedge, using no filter (clear) and a Wratten 16 filter (minus blue). An exposure to the mercury 365 nm. emission line is also made with a mercury lamp through a Wratten 18A filter. The coatings are processed six minutes in Kodak D-19 developer, fixed, washed and dried. The relative clear, minus blue, and 365 line speeds listed in the table below are based on 100 for the control of unsupersensitized Dye A alone.

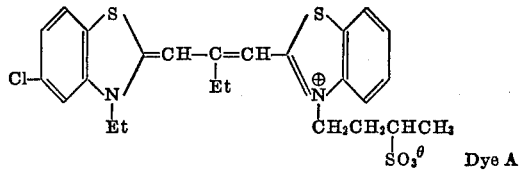

Dye A

| Dye (mg./mole Ag) | Relative speed | | | Fog | Sensitivity maximum (nm.) |
|---|---|---|---|---|---|
| | Clear | Minus blue | 365 line | | |
| A (250) | 100 | 100 | 100 | .05 | 650 |
| A (250) plus: | | | | | |
| VIII (52) | 117 | 110 | 135 | .05 | 650 |
| IX (64) | 182 | 200 | 148 | .06 | 650 |
| VIII (52) | 59 | 12 | 148 | .04 | ¹ 590 |
| IX (64) | 100 | 68 | 162 | .04 | 590 |
| Undyed | 22 | | 74 | .04 | |

¹ Broad.

Dye VIII and Dye IX have the capability of supersensitizing Dye A as can be seen from both the clear and minus blue speeds of the coatings containing them. As the 365 line speeds indicate, Dyes VIII and IX alone show substantial chemical sensitization in this emulsion at the levels used.

The invention has been described in detail with particular reference to preferred embodiments thereof, but it will be understood that variations and modifications can be effected within the spirit and scope of the invention.

I claim:
1. A photographic element comprising a support, a silver halide emulsion and a methine dye having the following structure:

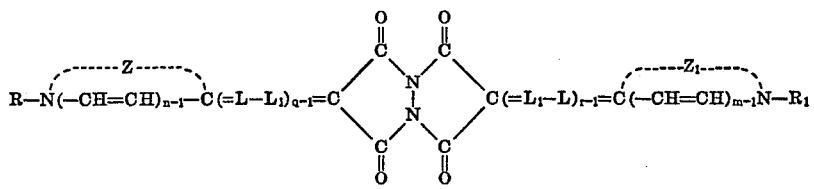

wherein R and $R_1$ each represents an alkyl group of 1 to 18 carbon atoms or an aryl group of 6 to 12 carbon atoms; Z and $Z_1$ each represents the nonmetallic atoms required to complete a heterocyclic nucleus selected from the group consisting of a thiazole nucleus, a benzothiazole nucleus, a naphthothiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3,3-dialkylindolenine nucleus, an imidazole nucleus, a benzimidazole nucleus and a naphthimidazole nucleus L and $L_1$ each represents a methine group; $n$ and $m$ each represents an integer from 1 to 2 and $q$ and $r$ each represents 2.

2. A photographic element according to claim 1 in which said dye has the following structure:

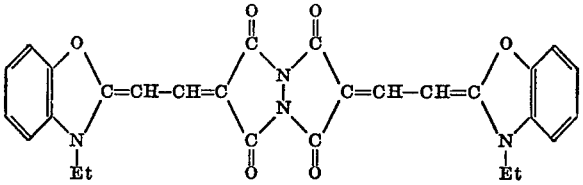

3. A photographic element according to claim 1 in which said dye has the following structure:

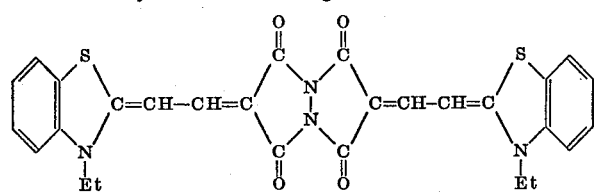

4. A photographic element according to claim 1 in which said dye has the following structure:

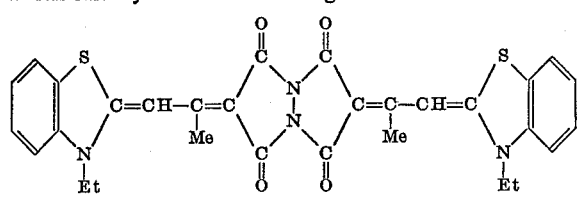

5. A photographic element according to claim 1 in which said dye has the following structure:

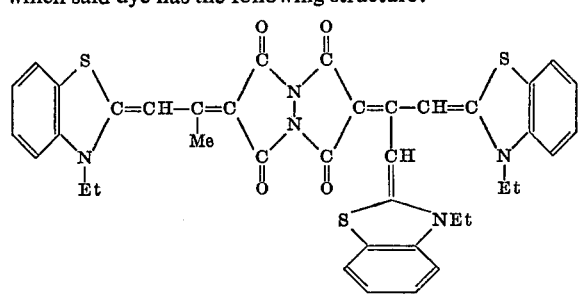

6. A photographic element according to claim 1 in which said dye has the following structure:

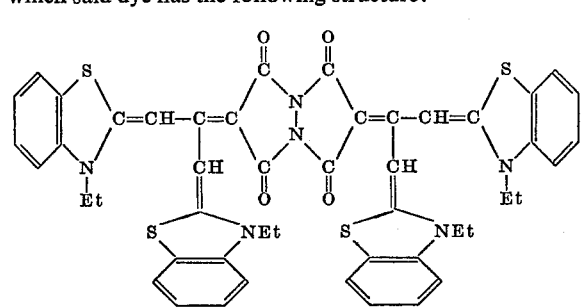

7. A photographic silver halide emulsion sensitized with a methine dye selected from the group consisting of (a)

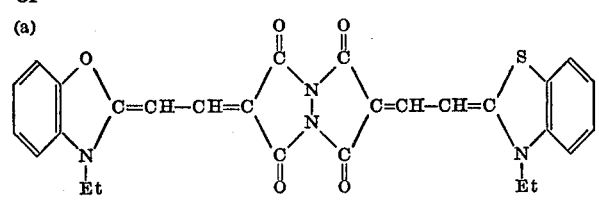

(b)

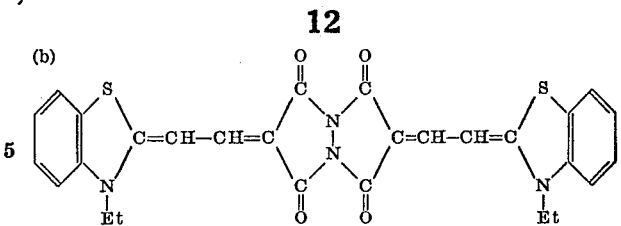

(c)

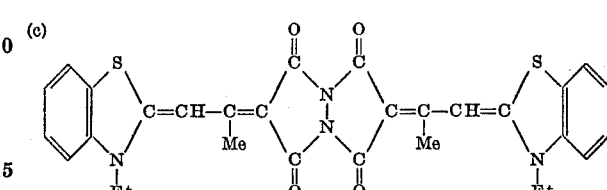

(d)

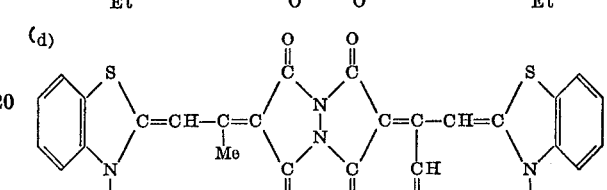

and (e)

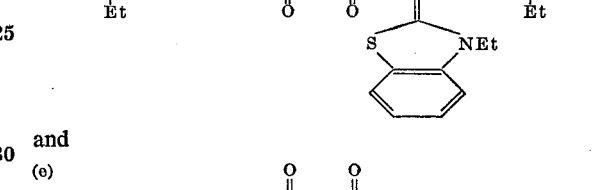

References Cited

UNITED STATES PATENTS

| | | | |
|---|---|---|---|
| 2,927,026 | 3/1960 | Haseltine et al. | 96—141 |
| 3,140,951 | 7/1964 | Haseltine et al. | 96—127 |
| 3,213,089 | 10/1965 | Haseltine et al. | 96—127 |
| 3,379,533 | 4/1968 | Jenkins et al. | 96—127 |

FOREIGN PATENTS 1,075,391   7/1967   Great Britain _____ 96—127

OTHER REFERENCES

Le Berre et al., Compt. rend. vol. 260, p. 5296 (1965).

J. TRAVIS BROWN, Primary Examiner

U.S. Cl. X.R.

96—84, 127, 139, 141; 260—240.1, 240.4